United States Patent

Gotal et al.

[15] 3,705,372
[45] Dec. 5, 1972

[54] CAST-TYPE WINDING STRUCTURE FOR ELECTRICAL INDUCTIVE APPARATUS

[72] Inventors: Joseph Gotal, Parrell, Pa.; Edmond E. Conner, Brookfield, Ohio

[73] Assignee: Westinghouse Electric Corporation, Pittsburgh, Pa.

[22] Filed: Dec. 7, 1971

[21] Appl. No.: 205,584

[52] U.S. Cl. ............... 336/182, 336/205, 336/207, 336/208, 336/209, 174/52 PE
[51] Int. Cl. .................................................. H01f 27/32
[58] Field of Search........330/96, 182, 207, 209, 208, 330/205; 174/52 PE

[56] References Cited

UNITED STATES PATENTS 3,210,701  10/1965  Fastner.................................336/96
3,254,282  5/1966  West..............................174/52 PE
3,548,357  12/1970  Peckham..........................336/205

Primary Examiner—E. A. Goldberg
Attorney—A. T. Stratton et al.

[57] ABSTRACT

Transformer winding structure having a low-voltage winding, a rubber spool positioned around the low-voltage winding, and a plurality of high-voltage winding sections which are positioned in channels of the spool. The high-voltage winding sections are divided into layers by epoxy impregnated paper insulating strips and the assembly is covered with a filled epoxy resin. The entire structure is encapsulated in a molded rubber casing. The resiliency of the rubber spool relieves stresses in the filled epoxy material.

6 Claims, 4 Drawing Figures

PATENTED DEC 5 1972  3,705,372

3,705,372

CAST-TYPE WINDING STRUCTURE FOR ELECTRICAL INDUCTIVE APPARATUS

BACKGROUND OF THE INVENTION

1. Field of the Invention

This invention relates, in general, to electrical inductive apparatus and, more specifically, to cast epoxy transformer winding structures.

2. Description of the Prior Art

The advantages of using cast epoxy windings in transformers have been realized for several years. The substantially rigid nature of the cured epoxy gives the winding structure excellent resistance to physical movement of the winding structure components. The low porosity of epoxy effectively keeps moisture and other contaminants from reacting with fibrous insulating members of the winding structure. Excellent insulating characteristics are obtained due to the high dielectric strength of epoxides.

As new transformers are being developed and as old transformer arrangements are being updated, the use of epoxy cast winding structures is increasing. One important factor which must be solved in using cast epoxy winding structures concerns the tendency of the epoxy to crack during the curing process. Conventional cast epoxy winding structures contain rigid supporting and insulating members over which the epoxy is cast. The epoxy changes size as it cures and stresses are established in the cured epoxy. Unless these stresses are relieved, fractures and cracks in the epoxy casting usually occur during or soon after the epoxy cures, or when the winding structure undergoes thermal changes.

Therefore, it is desirable, and it is an object of this invention, to provide a cast epoxy winding structure for use in electrical inductive apparatus which does not crack due to unrelieved stresses.

SUMMARY OF THE INVENTION

There is disclosed herein a new and useful cast epoxy winding structure which is constructed of suitable materials that are properly positioned to function together for reducing permanent stresses in the winding structure. A spool, constructed of a resilient material, such as butyl rubber, is positioned around the low-voltage winding. The spool contains a channel into which the high-voltage winding is wound. In one embodiment of this invention, a plurality of channels and high-voltage winding sections are used. Each winding section has its conductor turns separated by epoxy impregnated paper strips to form conductor layers. A filled epoxy resin is cast around the spool and the high-voltage winding sections and the entire assembly has a molded casing thereon. The resiliency of the spool relieves stresses in the cast epoxy material, thereby reducing the susceptibility to cracking.

BRIEF DESCRIPTION OF THE DRAWING

Further advantages and uses of this invention will become more apparent when considered in view of the following detailed description and drawing, in which.

DESCRIPTION OF THE PREFERRED EMBODIMENTS

Figure 1:
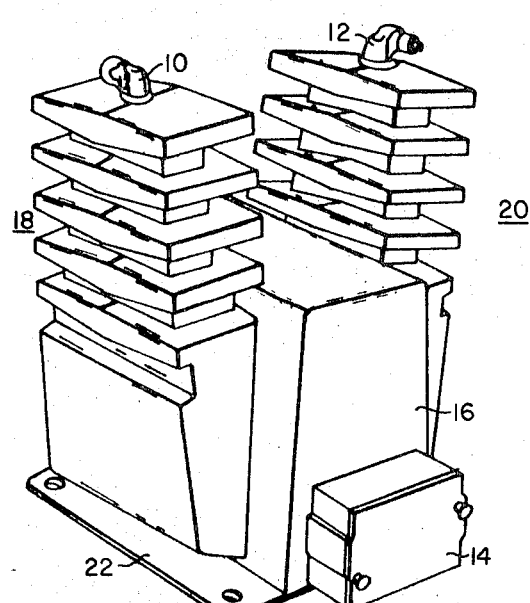
FIG. 1 is a view of a potential transformer which contains a winding structure constructed according to the teachings of this invention.

Throughout the following description, similar reference characters refer to similar members in all figures of the drawing.

Referring now to the drawing, and FIG. 1 in particular, there is shown a potential transformer of the molded casing type. The high-voltage terminals 10 and 12 provide means for connecting the transformer to the high-voltage circuit being measured. The low-voltage connectors are contained within the conduit box 14. The core and winding enclosure 16 and the bushings 18 and 20 are formed by molding a high-voltage rubber material around the internal components of the potential transformer. The rubber material is specially compounded for excellent weathering, electrical tracking resistance, and anti-cracking characteristics. The entire transformer structure is attached to a stainless steel base plate 22 for mounting purposes.

Figure 2:
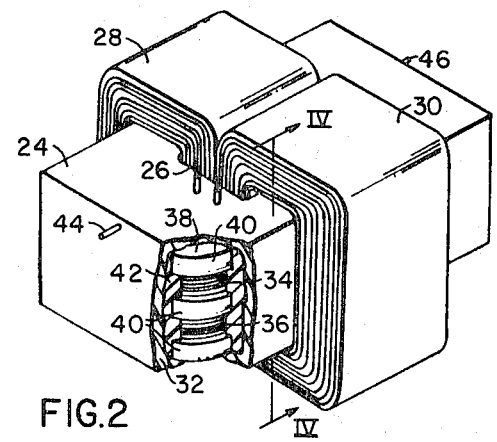
FIG. 2 is a view of the core and winding assembly of the transformer shown in FIG. 1.

FIG. 2 illustrates the physical arrangement of the core and winding structures which are contained within the molded enclosure 16. The over-all winding structure 24 is substantially rectangular with an opening 26 extending from one side to the other side of the winding structure 24. The magnetic cores 28 and 30 extend through the opening 26 and around the outside of the winding structure 24 to form low reluctance magnetic paths around the winding structure 24. Although other types of magnetic cores may be used, the cores illustrated are wound of Hipersil steel strips.

The internal components of the winding structure are shown by the cutaway portion of FIG. 2. The winding structure covering 32 comprises a suitable insulating material, such as high-voltage rubber. In the embodiment shown, the high-voltage winding consists of the sections 34 and 36 which are formed by winding conductors around channels in a spool 38. The spool channels are formed by the ridges 40 which extend around the circumference of the spool 38. An epoxy resin material 42 covers the spool ridges 40 and the winding sections 34 and 36. In the complete transformer structure, the high-voltage leads 44 and 46 would be connected by suitable means to the high-voltage terminals 10 and 12, respectively. Similarly, the low-voltage leads would be connected to appropriate terminal means in the conduit box 14.

Figure 3:
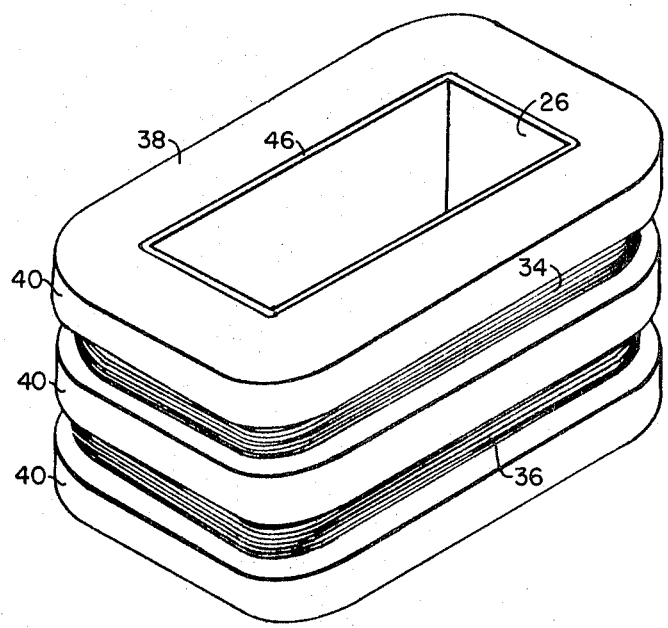
FIG. 3 is a view showing the spool member of the winding structure shown in FIG. 2.

A view of the spool 38 and the high-voltage winding structure before application of the molded covering 32 and the cast epoxy material 42 is shown in FIG. 3. Although two spool channels and two high-voltage winding sections 34 and 36 are shown, any number of channels and winding sections may be used within the contemplation of this invention. The spool 38 could also be circularly shaped instead of being substantially rectangularly shaped as illustrated. The opening 26 in the spool 38 is defined by the low-voltage winding form 46 which has a substantially rectangular shape.

Figure 4:
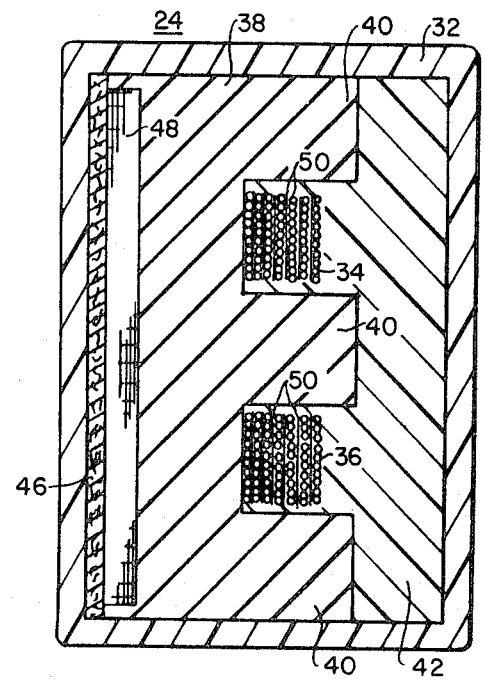
FIG. 4 is a cross-sectional view of the winding structure of FIG. 2 taken along the line IV—IV.

A detailed illustration of the cast winding structure 24 is shown in FIG. 4, which is a cross-sectional view taken along the line IV—IV of FIG. 2. In FIG. 4, a low-voltage winding 48 is wound around the winding form 46. The spool 38 is positioned substantially on the outside of the low-voltage winding 48 and is constructed of a suitable material, such as butyl rubber. A convenient method of constructing the spool is to mold the spool material around the low-voltage winding 48. This encapsulates the low-voltage winding 48 ad enhances its mechanical strength.

The high-voltage winding sections 34 and 36 are positioned in the channels formed by the spool ridges 40. Each section comprises a plurality of conductor turns which are divided into layers by an appropriate insulating means, such as by the Kraft paper strips 50. To improve the characteristics of the high-voltage winding sections, the Kraft paper strips 50 may be impregnated with a suitable epoxy resin, such as a non-filled flexibilized epoxy. The strips 50 extend beyond the conductors to aid the insulation between the ends of adjacent conductor layers.

The outer surfaces of the ridges 40 and the exposed surfaces of the high-voltage winding sections 34 and 36 are covered with a suitable epoxy resin material 42. A suitable material would be a beryl-filled flexibilized epoxy. A casting method may be used for deposition of the material 42 whereby it is injected onto the spool and winding section surfaces while they are under a vacuum. This method permits the epoxy material 42 to fill the complete area of the spool channels and prevent voids in the insulation structure. The entire winding structure 24 includes a molded covering 32 which surrounds the components of the winding structure.

The cushioning effect of the elastomeric spool 38 allows the stresses in the cast epoxy materials to be relieved, thus the crack resistance of the winding structure is improved. Since numerous changes may be made in the above-described apparatus and different embodiments of the invention may be made without departing from the spirit thereof, it is intended that all of the matter contained in the foregoing description, or shown in the accompanying drawings, shall be interpreted as illustrative rather than limiting.

We claim as our invention:

1. A transformer assembly comprising a magnetic core, a winding structure positioned in inductive relationship with said magnetic core, said winding structure comprising first and second windings, a spool constructed of an elastomeric material, said spool being positioned substantially around the outside of said first winding, said second winding being wound substantially around the outside of said spool, said winding structure having a flexibilized epoxy material disposed substantially around the outside of said second winding and said spool.

2. The transformer assembly of claim 1 wherein the elastomeric material from which the spool is constructed comprises butyl rubber.

3. The transformer assembly of claim 1 wherein the flexibilized epoxy material which is disposed substantially around the outside of the second winding and the spool comprises a beryl-filled epoxy.

4. The transformer assembly of claim 1 wherein the spool contains a plurality of channels, the second winding comprises a plurality of winding sections each positioned in a different channel of the spool, and the winding sections comprise layers of conductor turns which are separated by insulating means.

5. The transformer assembly of claim 4 wherein the insulating means which separates the conductor turns comprises strips of paper impregnated with an epoxide.

6. A potential transformer comprising a cast winding structure having an opening therethrough, magnetic core means positioned in said opening and inductively coupled to said winding structure, said winding structure comprising a low-voltage winding disposed substantially around said opening, a spool having a plurality of channels, said spool being constructed of butyl rubber and positioned substantially around said low-voltage winding, said winding structure comprising a plurality of high-voltage winding sections with each high-voltage winding section positioned in a different channel of said spool, each of said high-voltage winding sections being divided into layers by epoxy impregnated paper strips positioned between the conductor turns of said winding sections, said spool and said high-voltage winding sections having a beryl-filled flexibilized epoxy material disposed thereon.

* * * * *